Patented June 5, 1934

1,961,576

UNITED STATES PATENT OFFICE 1,961,576

STABLE CALCIUM HYPOCHLORITE COMPOSITION

Maurice C. Taylor, Niagara Falls, N. Y., assignor to The Mathieson Alkali Works, Inc., New York, N. Y., a corporation of Virginia No Drawing. Application August 17, 1932, Serial No. 629,130

4 Claims. (Cl. 23—250)

This invention relates to improvements in compositions consisting essentially of calcium hypochlorite and provides, particularly, such compositions of improved stablitiy. The addition of calcium oxide to calcium hypochlorite and calcium hypochlorite products as a stabilizing agent has hitherto been proposed. I have found that sodium oxide is more effective than calcium oxide as a stabilizing agent for calcium hypochlorite and calcium hypochlorite products and also that, when used as a stabilizing agent, it has other important advantages, particularly in mixtures of calcium hypochlorite with other reagents, such as sodium carbonate for example, intended to produce solutions of sodium hypochlorite when dissolved in water. The improved compositions of my invention comprise calcium hypochlorite and, as a stabilizing agent, a minor proportion of sodium oxide. The following examples illustrate compositions embodying my invention:

Example I 250 parts (by weight) of a calcium hypochlorite product containing upwards of 63% calcium hypochlorite and less than 2% of water, produced for example as described in any of United States Letters Patent Numbers 1,713,650, 1,718,285 and 1,787,048, are mixed with 14 parts of sodium oxide.

Example II 51 parts of the same calcium hypochlorite product are mixed with 43 parts of dry sodium carbonate and 7 parts of sodium oxide.

Example III 100 parts of the same calcium hypochlorite product are mixed with 300 parts of dry sodium carbonate and 16 parts of sodium oxide.

Example IV 170 parts of the same calcium hypochlorite product are mixed with 706 parts of sodium chloride, 104 parts of sodium carbonate and 20 parts of sodium oxide.

My invention is also useful, for example, in connection with calcium hypochlorite compositions including sodium fluoride, sodium sulphate, sodium borate, sodium phosphate and sodium silicate. It is advantageous, to develop a maximum effectiveness of the sodium oxide as a stabilizing agent, to reduce each of the constituents of the composition to a pulverulent condition, 20 mesh or finer, before or during mixture. If desired, these compositions can be formed into compressed tablets or blocks of any convenient size. Sodium oxide, as compared to calcium oxide, apparently is more effective as a stabilizing agent because of greater rapidity of action in absorbing water to the presence of which instability of such compositions is usually ascribed. However, this is stated merely as a hypothesis and my invention is not predicated upon this hypothesis but upon the observed fact of improved stability. In connection with the stabilization of mixtures of calcium hypochlorite and sodium carbonate for example, my invention has two special advantages. Such mixtures, intended to produce a solution of sodium hypochlorite when dissolved in water, usually comprise calcium hypochlorite and a sodium salt of an acid the calcium salt of which is insoluble or but sparingly soluble, and consequently the normal use of such mixtures involves the formation of a sludge of the precipitated calcium salt. The use of calcium oxide as a stabilizing agent in such mixtures increases the amount of the sludge so formed when the mixture is dissolved in water. This effect is avoided by my invention. Further, calcium oxide present as a stabilizing agent must be precipitated by the sodium salt used in such mixtures, thus decreasing the net available calcium hypochlorite content of such mixtures not only by the amount of the stabilizing agent but also by the amount of the sodium salt necessary to precipitate the stabilizing agent. In some cases this combined effect so limits the available calcium hypochlorite content, or in other words the available chlorine content, of the composition as to preclude the use of calcium oxide as a stabilizing agent, and in any case increases the bulk of the calcium hypochlorite composition per unit of available chlorine over that when using sodium oxide. This effect also is avoided by my invention.

I claim:

1. A calcium hypochlorite composition of improved stability, comprising calcium hypochlorite and a minor proportion of sodium oxide.

2. A calcium hypochlorite composition of improved stability, comprising calcium hypochlorite, sodium carbonate and a minor proportion of sodium oxide.

3. A calcium hypochlorite composition of improved stability, comprising calcium hypochlorite, sodium carbonate, sodium chloride and a minor proportion of sodium oxide.

4. A calcium hypochlorite composition of improved stability, comprising calcium hypochlorite, a sodium salt reacting with calcium hypochlorite to form sodium hypochlorite and an insoluble or sparingly soluble calcium salt, and a minor proportion of sodium oxide.

MAURICE C. TAYLOR.